United States Patent
Omi

(10) Patent No.: US 7,835,633 B2
(45) Date of Patent: Nov. 16, 2010

(54) FACE IMAGE CAPTURING APPARATUS

(75) Inventor: Takuhiro Omi, Anjo (JP)

(73) Assignee: Denso Corporation, Kariya (JP)

( * ) Notice: Subject to any disclaimer, the term of this patent is extended or adjusted under 35 U.S.C. 154(b) by 262 days.

(21) Appl. No.: 12/081,798

(22) Filed: Apr. 22, 2008

(65) Prior Publication Data

US 2008/0267600 A1     Oct. 30, 2008

(30) Foreign Application Priority Data

Apr. 25, 2007    (JP) .............................. 2007-116131

(51) Int. Cl.
*G03B 29/00*    (2006.01)
(52) U.S. Cl. .......................................... 396/18; 348/78
(58) Field of Classification Search .................. 396/14, 396/18, 51; 348/78, 77
See application file for complete search history.

(56) References Cited

U.S. PATENT DOCUMENTS

| | | | | |
|---|---|---|---|---|
| 6,714,665 | B1 * | 3/2004 | Hanna et al. ................. | 382/117 |
| 6,813,439 | B2 * | 11/2004 | Misumi et al. .................. | 396/2 |
| 6,952,498 | B2 * | 10/2005 | Ishikura ....................... | 382/190 |
| 7,091,471 | B2 * | 8/2006 | Wenstrand et al. .......... | 250/221 |
| 2004/0005083 | A1 * | 1/2004 | Fujimura et al. ............ | 382/103 |
| 2004/0170304 | A1 * | 9/2004 | Haven et al. ................ | 382/115 |
| 2006/0245749 | A1 * | 11/2006 | Nakamura ................... | 396/155 |

FOREIGN PATENT DOCUMENTS

| | | |
|---|---|---|
| JP | A-2005-251224 | 9/2005 |
| JP | A-2007-004448 | 1/2007 |

OTHER PUBLICATIONS

U.S. Appl. No. 12/155,019, filed May 29, 2008, Omi.

* cited by examiner

*Primary Examiner*—W. B. Perkey
*Assistant Examiner*—Warren K Fenwick
(74) *Attorney, Agent, or Firm*—Posz Law Group, PLC

(57) ABSTRACT

A face image capturing apparatus includes a camera, an on-axis illuminator, an off-axis illuminator, an illumination control device, an image capturing control device, and a luminance calculation process device. The camera repeatedly captures an image of a face of an occupant of a vehicle. The illumination control device is configured to adjust an illumination condition of light applied to the face of the occupant. The image capturing control device is configured to control the camera 10 to capture the image of the face at an image capturing timing that is synchronized with a timing for adjusting the illumination condition. The luminance calculation process device is configured to perform a luminance calculation process by using a bright pupil face image, a dark pupil face image, and an ambient light face image.

15 Claims, 7 Drawing Sheets

BRIGHT PUPIL FACE IMAGE px (ON-AXIS ILLUMINATOR + AMBIENT LIGHT)

DARK PUPIL FACE IMAGE py (OFF-AXIS ILLUMINATOR + AMBIENT LIGHT)

AMBIENT LIGHT FACE IMAGE pz (ONLY AMBIENT LIGHT)

PART DETECTION IMAGE $(px+py-2\times pz)$

PUPIL IMAGE $(px-py)$

COMPOSITE IMAGE

BRIGHT PUPIL FACE IMAGE px (ON-AXIS ILLUMINATOR + AMBIENT LIGHT)

DARK PUPIL FACE IMAGE py (OFF-AXIS ILLUMINATOR + AMBIENT LIGHT)

AMBIENT LIGHT FACE IMAGE pz (ONLY AMBIENT LIGHT)

BRIGHT PUPIL FACE IMAGE pxpy FREE OF REFLECTION

DARK PUPIL FACE IMAGE pypx FREE OF REFLECTION (pxpy+pypx−2×pz)

PART DETECTION IMAGE FREE OF REFLECTION AND AMBIENT LIGHT (pxpy−pypx)

PUPIL IMAGE FREE OF REFLECTION AND AMBIENT LIGHT

FACE IMAGE CAPTURING APPARATUS

CROSS REFERENCE TO RELATED APPLICATION

This application is based on and incorporates herein by reference Japanese Patent Application No. 2007-116131 filed on Apr. 25, 2007.

BACKGROUND OF THE INVENTION

1. Field of the Invention

The present invention relates generally to a face image capturing apparatus for capturing a face image of a driver.

2. Description of Related Art

A driver monitoring apparatus is known to use sensing means for acquiring a face image of a driver to detect an unfavorable state of the driver during driving operations, such as drowsiness and an inattentive driving. The above driver monitoring apparatus is required to reliably capture the face images regardless of a time, such as daytime or nighttime. Thus, conventionally, light including near infrared light is applied from an illuminator to a face of the driver as reference light such that a reliable situation for capturing the face images is established. Then, the face image captured under the above situation is processed through image processing such that the face of the driver is detected and a face part is detected.

However, in fact, because of the adverse influence by the sunlight, a reflected light by buildings, and reflection of the light from the illuminator reflected by eyeglasses of the driver, the image processing may be difficult to be sufficiently performed and also the above detection may not be achieved disadvantageously.

To address the above disadvantages, a technique described in JP-A-2002-352229 corresponding to U.S. Pat. No. 6,952,498 captures the images of a face portion of the driver when the driver is applied with illumination from two directions and reflected images are removed from the captured images to detect a retina reflected image. In the above, the reflected image in one of the captured images is located at a position different from a position of the reflected image in the other one of the captured images, and the above reflected images are determined as images that correspond to a glossy reflective surface of the eyeglasses.

In the above technique described in JP-A-2002-352229, the image that is free of the reflected image reflected by the glossy reflective surface may be acquired, however, the influence by ambient light, such as the sunlight, may not be removed.

SUMMARY OF THE INVENTION

The present invention is made in view of the above disadvantages. Thus, it is an objective of the present invention to address at least one of the above disadvantages.

According to one aspect of the present invention, there is provided a face image capturing apparatus that includes a camera, an on-axis illuminator, an off-axis illuminator, an illumination control device, an image capturing control device, and a luminance calculation process device. The camera repeatedly captures an image of a face of an occupant of a vehicle. The on-axis illuminator is arranged generally coaxially relative to an optical axis of the camera. The off-axis illuminator is arranged non-coaxially relative to the optical axis of the camera. The illumination control device is configured to adjust an illumination condition of light applied to the face of the occupant by controlling a light quantity of light emitted by the on-axis illuminator and a light quantity of light emitted by the off-axis illuminator. The image capturing control device is configured to control the camera 10 to capture the image of the face at an image capturing timing that is synchronized with a timing for adjusting the illumination condition by the illumination control device. The luminance calculation process device is configured to perform a luminance calculation process for by using following face images. A bright pupil face image is captured by the camera under a first illumination condition, in which light is applied to the face mainly by the on-axis illuminator. A dark pupil face image is captured by the camera under a second illumination condition, in which light is applied to the face mainly by the off-axis illuminator. An ambient light face image is captured by the camera under a third illumination condition, in which ambient light around the occupant is mainly applied to the face.

According to another aspect of the present invention, there is also provided a face image capturing apparatus for a vehicle, the apparatus including a camera, an on-axis illuminator, an off-axis illuminator, an illumination control device, an image capturing control device, and a luminance calculation process device. The camera repeatedly captures an image of a face of an occupant of the vehicle. The on-axis illuminator is arranged generally on an optical axis of the camera. The off-axis illuminator is arranged generally off the optical axis of the camera. The illumination control device is configured to control the on-axis illuminator and the off-axis illuminator for adjustment of an illumination condition of light that is applied to the face of the occupant. The image capturing control device is configured to control the camera 10 to capture the image of the face at an image capturing timing that is synchronized with a timing of the illumination control device for adjusting the illumination condition. The luminance calculation process device is configured to generate at least one difference image of the face of the occupant using a bright pupil face image, a dark pupil face image, and an ambient light face image. The bright pupil face image is captured by the camera under a first illumination condition, in which the face receives light emitted mainly by the on-axis illuminator. The dark pupil face image is captured by the camera under a second illumination condition, in which the face receives light emitted mainly by the off-axis illuminator. The ambient light face image is captured by the camera under a third illumination condition, in which the face receives mainly ambient light around the occupant.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

One embodiment of the present invention is described with reference to accompanying drawings. Note that, the present embodiment describes that a face image capturing apparatus of the present invention is employed to capture a face image of a driver of a vehicle.

Figure 1:
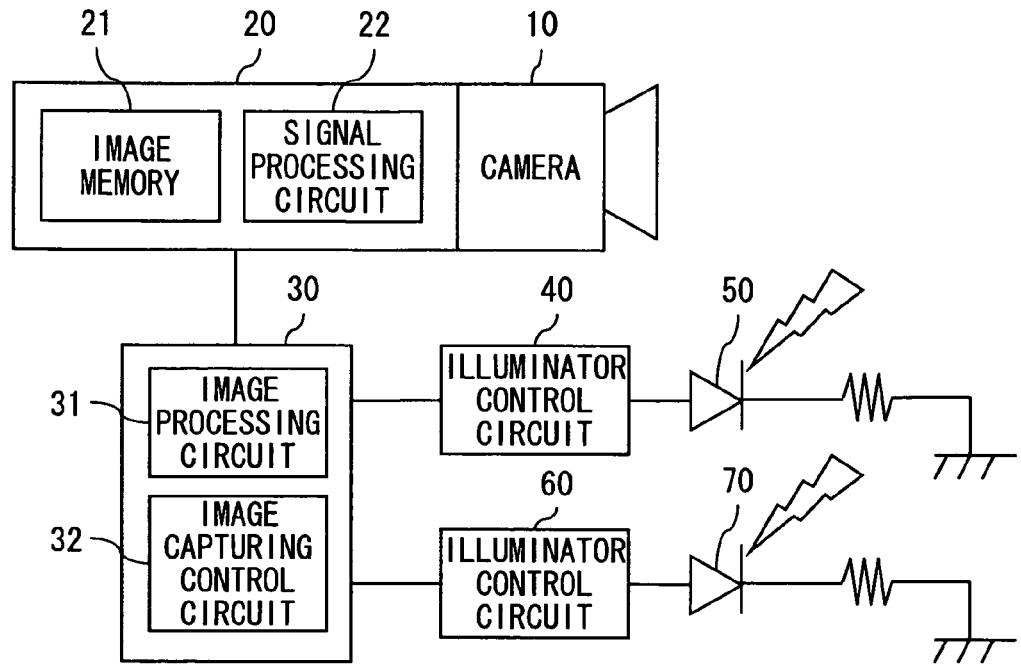
FIG. 1 is a block diagram illustrating a general configuration of a face image capturing apparatus of one embodiment of the present invention.

As shown in FIG. 1, the face image capturing apparatus includes a camera 10, a camera device 20, an image ECU 30, illuminator control circuits 40, 60, an on-axis illuminator 50, an off-axis illuminator 70. The above camera device 20 is provided integrally with the camera 10.

Figure 2:
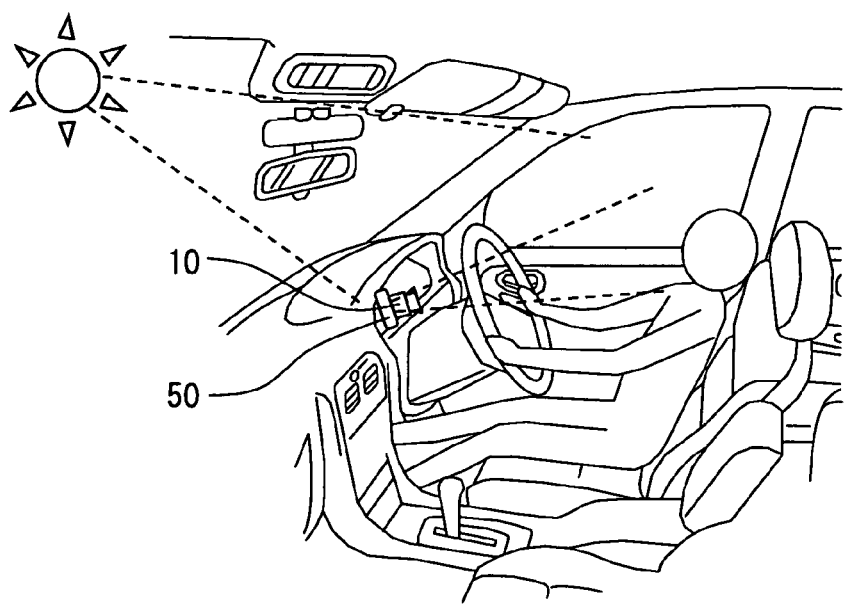
FIG. 2 is a diagram illustrating an arrangement of a camera and an on-axis illuminator in a passenger compartment of a vehicle.

The camera 10, as shown in FIG. 2, is employed to capture the face image of the driver or an occupant of the vehicle and is provided in a vicinity of an instrument panel inside the passenger compartment of the vehicle. The camera 10 employs an imager that is configured to perform a high-speed imaging such that the camera 10 is able to capture images based on an image capturing time or an exposure time for capturing the image of about 300 μsec and based an image capturing time interval of about 30 μsec between capturing of the images.

The camera device 20 shown in FIG. 1 includes an image memory 21 and a signal processing circuit 22. The image memory 21 stores image information of the image captured by the camera 10. The signal processing circuit 22 reads the image information stored in the image memory 21 and executes luminance calculation process, which is described later. Then, the signal processing circuit 22 outputs to the image ECU 30 the image information generated by the luminance calculation process.

The image ECU 30 includes an image processing circuit 31 and an image capturing control circuit 32. The image processing circuit 31 receives the image information outputted from the camera device 20 and executes image processing, such as processing for detecting a part corresponding to the face of the driver based on the above image information and processing for detecting a gaze of the driver. The image capturing control circuit 32 controls capturing timing for capturing an image by the camera 10 to synchronize with adjustment of an illumination condition by the illuminator control circuits 40, 60. In other words, the image capturing control circuit 32 controls the camera 10 to capture the image at a timing that synchronizes with a timing for adjusting the illumination condition by the illuminator control circuits 40, 60, for example. Also, the image capturing control circuit 32 controls an exposure time and an output gain of the camera 10.

Figure 3:
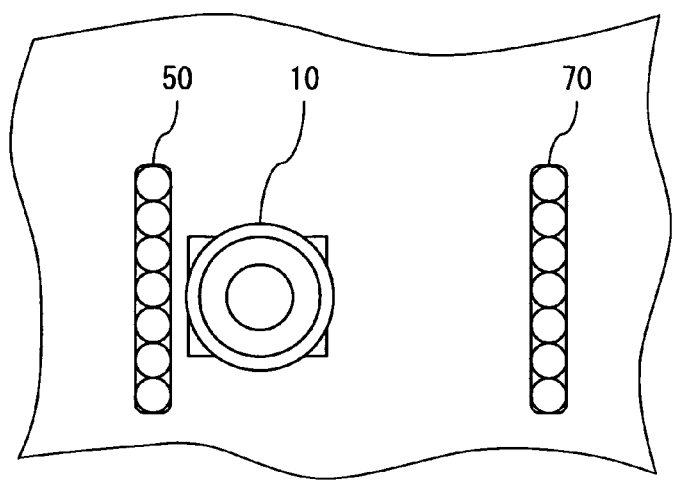
FIG. 3 is a diagram illustrating a state, in which the on-axis illuminator is arranged generally coaxially relative to an optical axis of the camera and an off-axis illuminator is arranged non-coaxially relative to the optical axis of the camera.

The illuminator control circuit 40 controls a timing of turning on and off of the on-axis illuminator 50, and also the illuminator control circuit 40 adjusts a light quantity or a light intensity of light emitted by the on-axis illuminator 50 when the on-axis illuminator 50 is on. The on-axis illuminator 50 is arranged generally coaxially relative to a lens optical axis or an optical axis of the camera 10, as shown in FIG. 2, FIG. 3. In other words, the on-axis illuminator 50 is arranged or disposed generally on the optical axis of the camera 10 such that the illumination axis of the on-axis illuminator 50 is generally on the optical axis of the camera 10. Also, the illuminator control circuit 60 controls a timing of turning on and off of the off-axis illuminator 70 and adjusts the light quantity of light emitted by the off-axis illuminator 70 when the off-axis illuminator 70 is on. The off-axis illuminator 70 is arranged non-coaxially relative to the optical axis of the camera 10 as shown in FIG. 3 and is spaced away from the optical axis of the camera 10 to some extent. In other words, the off-axis illuminator 70 is arranged or disposed off the optical axis of the camera 10 such that the illumination axis of the off-axis illuminator 70 is off the optical axis of the camera 10. The illuminator control circuits 40, 60 adjust the illumination condition of the light applied to the face of the driver while the adjustment synchronizes with the image capturing timing of the camera 10 for capturing the image.

As shown in FIG. 3, the on-axis illuminator 50 and the off-axis illuminator 70 are equipped with multiple light sources, each of which is able to apply an infrared light or a near infrared light having a center wavelength ranging from 850 to 950 nm. For example, each of the multiple light sources may be a light emitting diode (LED), and each of the illuminators 50, 70 may be an LED array that has the multiple LEDs. The multiple light sources are arranged in a longitudinal direction of the face of the occupant or the driver such that the multiple light sources apply light to the face of the driver. In other words, the multiple light sources are arranged in a vertical direction such that the multiple light sources are arranged generally in parallel with the longitudinal direction of the face of the driver.

Figure 4:
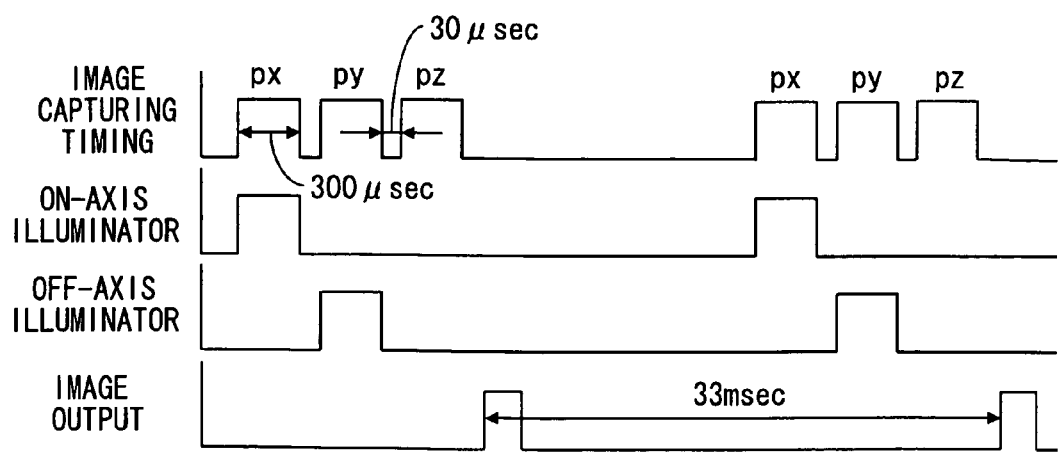
FIG. 4 is a timing chart illustrating a timing of capturing an image by the camera, a timing of turning on the coaxial illuminator and the non-coaxial illuminator, and a timing of outputting the face image captured by the camera.
Figure 5A:
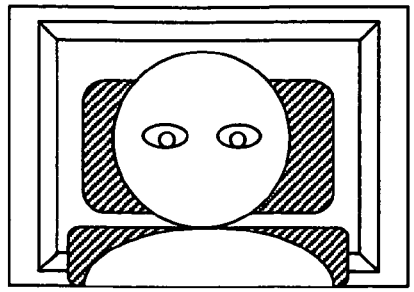
FIG. 5A is a diagram illustrating a bright pupil face image captured when a driver does not wear eyeglasses.

Next, the operation of the face image capturing apparatus is described. FIG. 4 is a timing chart of the image capturing timing of the camera 10, a lighting timing of the on-axis illuminator 50, a lighting timing of the off-axis illuminator 70, and an output timing of the camera 10 for outputting the captured face image. The face image capturing apparatus firstly causes the camera 10 to capture a bright pupil face image px under a first illumination condition, in which the face of the driver receives mainly the light applied by the on-axis illuminator 50 (see FIG. 5A). In practice, the face of the driver may receive the other light other than the light emitted by the on-axis illuminator 50, such as an ambient light (e.g., sunlight) around the driver. Also, the off-axis illuminator 70 may be adjusted such that the off-axis illuminator 70 simultaneously emit light having a significantly small light quantity in the above condition. Note that, the image capturing time for capturing the bright pupil face image px is set as about 300 μsec (microseconds). When the capturing of the bright pupil face image px is finished, the captured image information is temporarily stored in the image memory 21.

Figure 5B:
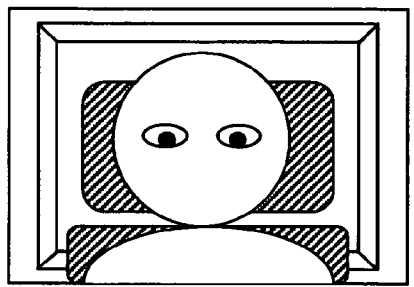
FIG. 5B is a diagram illustrating a dark pupil face image captured when the driver does not wear the eyeglasses.

About 30 μsec after the finish of the capturing of the bright pupil face image px, the camera 10 is caused to capture a dark pupil face image py under a second illumination condition, in which the face of the driver receives mainly the light emitted by the off-axis illuminator 70 (see FIG. 5B). In practice, the face of the driver may receives the other light other than the light emitted by the off-axis illuminator 70, such as the ambient light around the driver. Note that, the on-axis illuminator 50 may be alternatively adjusted such that the on-axis illuminator 50 is caused to simultaneously apply the light of the significantly small light quantity. The image capturing time for capturing the dark pupil face image py is set as about 300 μsec similar to the image capturing time of the bright pupil face image px. When the capturing of the dark pupil face image py is finished, the captured image information of the dark pupil face image py is temporarily stored in the image memory 21.

Figure 5C:
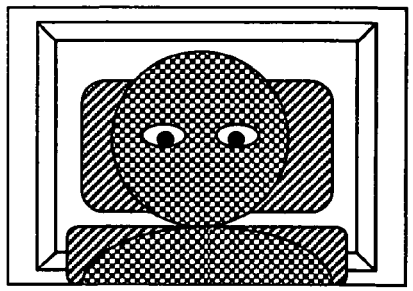
FIG. 5C is a diagram illustrating an ambient light face image captured when the driver does not wear the eyeglasses.

Then, about 30 μsec after the finish of the capturing of the dark pupil face image py, the camera 10 is caused to capture an ambient light face image pz under a third illumination condition, in which the face of the driver receives mainly the ambient light around the driver (see FIG. 5C). In the above condition, the on-axis illuminator 50 and the off-axis illuminator 70 may be adjusted such that the illuminators 50, 70 simultaneously apply the light of the significantly small light quantity. the image capturing time for capturing the ambient light face image pz is set as about 300 μsec similar to the above image capturing times of the bright pupil face image px and the dark pupil face image py. When the capturing of the ambient light face image pz is finished, the image information of the ambient light face image pz is temporarily stored in the image memory 21.

Note that, the camera 10 employs the imager that is able to perform the high-speed imaging. Thus, even when the face images are time-divisionally captured as above, the difference in the position of the captured face of the driver among the face images during the time-division capturing is negligible. The above difference in position of the driver may be caused by spontaneous movement of the driver and movement of the driver due to the vibration of the vehicle. Also, the change of the ambient light with time influencing upon the bright pupil face image px, the dark pupil face image py, and the ambient light face image pz is also negligible because time lag among the image capturing timings for capturing the above face images px, py, pz is very small. As above, because the face images pz, py, pz are captured at significantly short intervals, it is assumed that the face images pz, py, pz are captured at the same time. Thus, the order of the image capturing timings for capturing the face images pz, py, pz are not limited to the example order shown in FIG. 4, but may be modified as necessary.

When the bright pupil face image px, the dark pupil face image py, and the ambient light face image pz are captured as above, the signal processing circuit 22 executes a calculation process or a luminance calculation process for calculating a luminance of each of the bright pupil face image px, the dark pupil face image py, and the ambient light face image pz by using the image information temporarily stored in the image memory 21 for each of the above face images px, py, pz.

The luminance calculation process is executed to generate a part detection image that is a face image used for detecting the part corresponding to the face of the driver in the image. Also, the luminance calculation process is executed to generate a pupil image that is a face image used for detecting a position of the pupil of the driver. Different processes are executed depending on the presence or absence of an eyewear of the driver, such as the eyeglasses, the sunglasses.

In the above, there is described the generation of the part detection image and the pupil image by the luminance calculation process that uses the bright pupil face image px, the dark pupil face image py, and the ambient light face image pz. Firstly, as above, the bright pupil face image px is a face image that is captured when the face of the driver receives the light, a main component of which is the light applied by the on-axis illuminator 50. Thus, by causing the camera 10 to acquire the reflection of the light reflected on a retina of an eyeball of the driver, the pupil part of the eyeball in the acquired image is in particular shown brightly or the image of "red-eye effect" is captured. Also, the dark pupil face image py is a face image captured when the face of the driver receives the light, a main component of which is the light applied by the off-axis illuminator 70. Thus, the camera 10 is disabled to acquire the reflection of the light reflected on the retina of the eyeball of the driver, the pupil part of the eyeball in the image is not shown brightly relative to the case of the bright pupil face image px. In the above, the illumination axis of the off-axis illuminator 70 is positioned away from the lens optical axis of the camera 10 such that the off-axis illuminator 70 does not cause the red-eye effect. As a result, the luminance of the pupil part of the eyeball in the bright pupil face image px is greatly different from the luminance of the pupil part in the dark pupil face image py. Also, the luminance of the other part other than the pupil part in the face image px is generally equivalent to the luminance of the other part in the face image py.

Also, the ambient light face image pz is a face image captured when the face of the driver receives the light, a main component of which is the ambient light. Thus, the luminance of the face portion of the driver in the ambient light face image pz is relatively low compared with the luminance of the bright pupil face image px and the luminance of the dark pupil face image py. Also, the luminance of the background that surrounds the face in the face image pz is generally equivalent to the luminance of the background in the face images px, py.

As above, each of the three face images, such as the bright pupil face image px, the dark pupil face image py, and the ambient light face image pz, includes a luminance-different part, luminance of which is different from luminance of the corresponding part in the other face image. As a result, when the face image luminance calculation process is executed for the bright pupil face image px, the dark pupil face image py, and the ambient light face image pz, an extracted face image is generated. In the above, the extracted face image is made by extracting only the luminance-different part from the face images. Due to the above, the part detection image and the pupil image, which are free of the influence of the ambient light (e.g., the sunlight), is generated. In other words, the adverse influence of the ambient light on the face image is removed from or limited from being given to the part detection image and the pupil image.

Figure 6A:
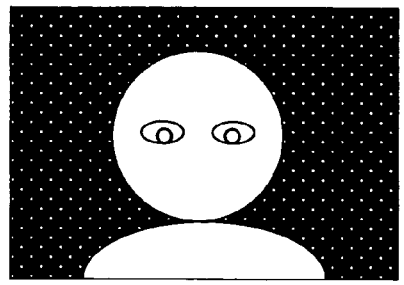
FIG. 6A is a diagram illustrating a part detection image when the driver does not wear the eyeglasses.

FIG. 6A is a diagram illustrating the part detection image. In the part detection image, the influence of the ambient light is removed, and the image corresponds to only the reflected light by the on-axis illuminator 50 and the off-axis illuminator 70. In order to generate the part detection image, firstly the luminance of the bright pupil face image px is added to the luminance of the dark pupil face image py to generate an addition face image (px+py). Then, a doubled face image (2×pz) is made by doubling the luminance of the ambient light face image pz. Then, the doubled face image (2×pz) is subtracted from the addition face image (px+py) to generate the part detection image (px+py−2×pz). The calculation, such as addition and subtraction, of the luminance in the luminance calculation process is performed for luminance of each pixel in the face image relative to luminance of the corresponding pixel in the other face image. For example, in the above calculation process of the luminance of the present embodiment, a difference image is generate. Note that, the luminance of the ambient light face image pz is doubled because the luminance of the ambient light in the addition face image (px+py) is doubled due to the addition of the luminance of the bright pupil face image px to the luminance of the dark pupil face image py.

Figure 6B:
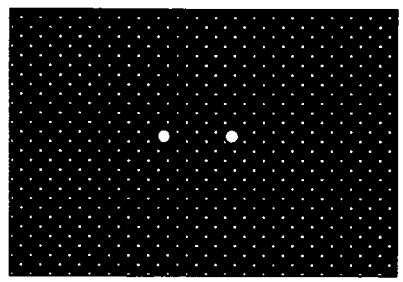
FIG. 6B is a diagram illustrating a pupil image when the driver does not wear the eyeglasses.

FIG. 6B is a diagram illustrating the pupil image. The pupil image is made by removing the influence of the ambient light and also by removing the influence of the reflected light from the on-axis illuminator 50 and the off-axis illuminator 70. Thus, the pupil image is an image that corresponds to the reflection of the light reflected on the retina of the eyeball of the driver. The pupil image (px−py) is generated by subtracting the luminance of the dark pupil face image py from the luminance of the bright pupil face image px.

Figure 7:
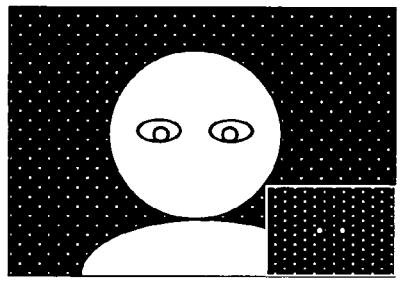
FIG. 7 is a diagram illustrating a composite image of the part detection image and the pupil image.

When the part detection image and the pupil image are generated as above, the signal processing circuit 22 outputs to the image ECU 30 the image information of the part detection image and the image information of the pupil image at intervals of 33 msec (milliseconds). In the above time, for example, as shown in FIG. 7, a reduced pupil image is synthesized and located in an area in the part detection image, in which area the face of the driver is not shown, such that single image information is synthesized to be outputted to the image ECU 30. Thus, an amount of the image information to be outputted is reduced.

Usually, the pupil part detected in FIG. 6B is shown by black and white in the image. However, the part corresponding to the pupil detected in FIG. 6B may be colored (for example, colored by red) in the composite image shown in FIG. 7. Due to the above, because the image ECU 30 executes the image processing using the composite image with the colored pupil, it becomes easier to detect the pupil of the driver.

Figure 8:
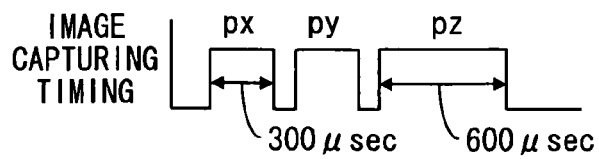
FIG. 8 is a timing chart illustrating an image capturing timing of the camera when an image capturing time for capturing the ambient light face image is set as about 600 μsec.

Also, as above, the image capturing time for capturing the ambient light face image pz, in other words, the exposure time for capturing the ambient light face image pz, is set as about 300 μsec similar to the image capturing time for capturing each of the bright pupil face image px and the dark pupil face image py. However, the image capturing time for the ambient light face image pz may be alternatively set as about 600 μsec (see FIG. 8). As a result, when the part detection image is generated, the luminance of the ambient light face image pz is not required to be doubled because the image capturing time for the face image pz is doubled as above.

There is described another luminance calculation process for the bright pupil face image px, the dark pupil face image py, and the ambient light face image pz executed when the driver wears a glossy reflective surface, such as the eyeglasses, the sunglasses. The luminance calculation process generates the part detection image and the pupil image, which are free of the influence of the ambient light and of the reflected light reflected by the glossy reflective surface, by using the image information of each of the face images px, py, pz.

Figure 9A:
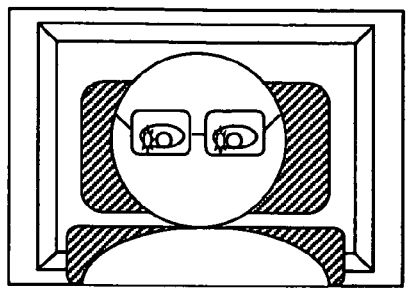
FIG. 9A is a diagram illustrating the bright pupil face image captured when the driver wears the eyeglasses.
Figure 9B:
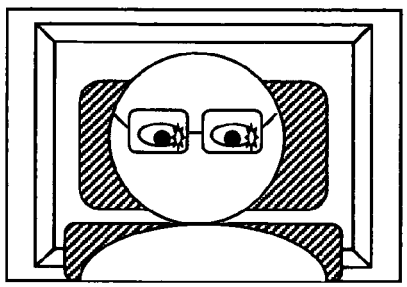
FIG. 9B is a diagram illustrating the dark pupil face image captured when the driver wears the eyeglasses.
Figure 9C:
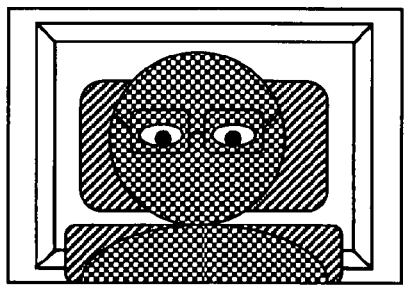
FIG. 9C is a diagram illustrating the ambient light face image captured when the driver wears the eyeglasses.

FIGS. 9A to 9C are diagrams illustrating the bright pupil face image px, the dark pupil face image py, and the ambient light face image pz, respectively, captured when the driver wears the eyeglasses. As shown in FIGS. 9A, 9B, when the driver wears the eyeglasses, the bright pupil face image px and the dark pupil face image py show the reflected light reflected by the eyeglasses. As a result, if the bright pupil face image px and the dark pupil face image py having the reflected light therein are used for the above luminance calculation process, the adverse influence of the reflected light may be given to the part detection image and the pupil image. Thus, the detection of the part and detection of the position of the pupil may become difficult to be performed.

In view of the above, when the driver wears the eyeglasses, firstly, a bright pupil face image pxpy and a dark pupil face image pypx, which are made free of the adverse influence of the reflected light reflected by the eyeglasses, are generated. In other words, the influence of the reflected light is removed from the captured face images to generate the bright pupil face image pxpy and the dark pupil face image pypx. Then, the above bright pupil face image pxpy, the above dark pupil face image pypx, and the ambient light face image pz are used for the execution of the luminance calculation process.

Figure 10A:
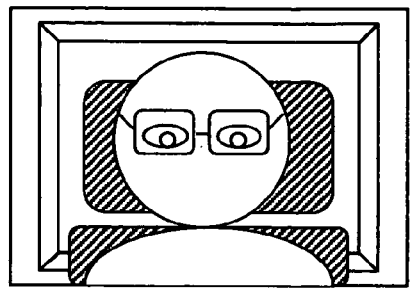
FIG. 10A is a diagram illustrating a bright pupil face image that is free of eyeglasses reflection.
Figure 10B:
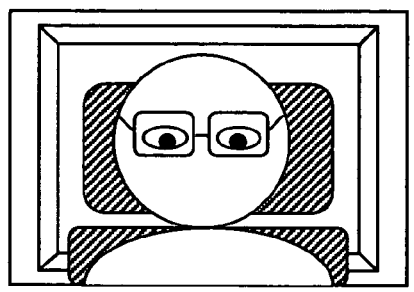
FIG. 10B is a diagram illustrating a dark pupil face image that is free of the eyeglasses reflection.

FIG. 10A is a diagram illustrating the bright pupil face image pxpy that is free of the eyeglasses reflection. FIG. 10B is a diagram of the dark pupil face image pypx that is free of the eyeglasses reflection. In order to generate the bright pupil face image pxpy and the dark pupil face image pypx, firstly, the luminance of the dark pupil face image py shown in FIG. 9B is subtracted from the luminance of the bright pupil face image px shown in FIG. 9A. Then, a value of the subtracted luminance is converted into an absolute value to generate an absolute-value face image (|px−py|). The luminance of the absolute-value face image (|px−py|) is compared with each luminance of the bright pupil face image px and the dark pupil face image py such a range (reflective range) that correspondingly shows the eyeglasses reflection is specified.

Then, the luminance of the specified reflective range in the bright pupil face image px is replaced with the other luminance of a part in the dark pupil face image py, which part corresponds to the specified reflective range in the bright pupil face image px. By replacing the luminance with the other luminance, the bright pupil face image pxpy shown in FIG. 10A that is free of the influence of the eyeglasses reflection is generated. Also, the luminance of the specified reflective range in the dark pupil face image py is replaced with the further other luminance of a part in the bright pupil face image px, which part corresponds to the specified reflective range in the dark pupil face image py. By replacing the luminance with the further other luminance, the dark pupil face image pypx shown in FIG. 10B that is free of the eyeglasses reflection is generated.

Figure 10C:
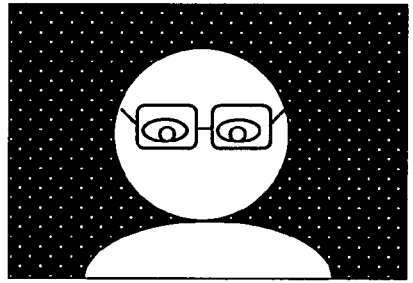
FIG. 10C is a diagram illustrating a part detection image that is free of the eyeglasses reflection and of the ambient light.

After the above, the luminance of the bright pupil face image pxpy is added to the luminance of the dark pupil face image pypx to generate an addition face image (pxpy+pypx). The luminance of the ambient light face image pz is doubled to generate the doubled face image (2×pz). The doubled face image (2×pz) is subtracted from the addition face image (pxpy+pypx) to generate the part detection image (pxpy+pypx−2×pz) shown in FIG. 10C, which detection image is free of the eyeglasses reflection and also of the ambient light.

Figure 10D:
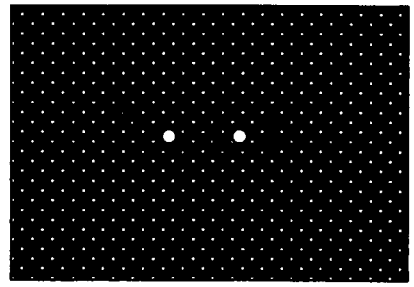
FIG. 10D is a diagram illustrating a pupil image that is free of the eyeglasses reflection and of the ambient light.

FIG. 10D is a diagram illustrating the pupil image that is free of the eyeglasses reflection and the ambient light. The luminance of the above dark pupil face image pypx is subtracted from the luminance of the above bright pupil face image pxpy to generate the pupil image (pxpy−pypy). When the part detection image and the pupil image, which are free of the eyeglasses reflection and the ambient light, are generated as above, the signal processing circuit 22 outputs to the image ECU 30 the image information of the part detection image and the image information of the pupil image at intervals of about 33 msec.

In general, in order to capture the face image of the occupant of the vehicle, the multiple light sources are required to provide adequate light quantity of the illuminator because it is comparatively dark in the passenger compartment of the vehicle. If the light sources are arranged in a transverse direction of the face of the occupant, the reflection by the glossy reflective surface of the eyeglasses may extend in the transverse direction in the image. As a result, the eyeglasses reflection in the bright pupil face image px may overlap with the eyeglasses reflection in the dark pupil face image py. If the eyeglasses reflection of one face image overlaps with the eyeglasses reflection of the other one face image, it becomes difficult to remove the eyeglasses reflection from the face images. In the present embodiment, the multiple light sources of the on-axis illuminator 50 and the multiple light sources of the off-axis illuminator 70 are arranged in the longitudinal direction of the face of the occupant. Thus, the eyeglasses reflection in the face image is limited from extending in the transverse direction of the face image, and thereby the eyeglasses reflection in the bright pupil face image px is limited from overlapping with the eyeglasses reflection in the dark pupil face image py. Thus, it becomes easier to remove the eyeglasses reflection from the face images in the present embodiment. In the above description, the overlap of the eyeglasses reflection in the one face image with the eyeglasses reflection in the other one face image indicates that the eyeglasses reflection is located at a position in the one face image similar to a position of the eyeglasses reflection in the other one face image, for example. Note that even when the light sources are arranged in the longitudinal direction of the face, reflected image of the light sources reflected by the eyeglasses in one face image may overlap with the reflected image of the light sources in the other face image. However, when the light sources are arranged in the longitudinal direction as above, the multiple reflected images are limited from being generated in the face image compared with the case, where the light sources are arranged in the transverse direction of the face. As a result, it is advantageous that the reflected images are less likely to overlap with each other in the face images.

Figure 11:
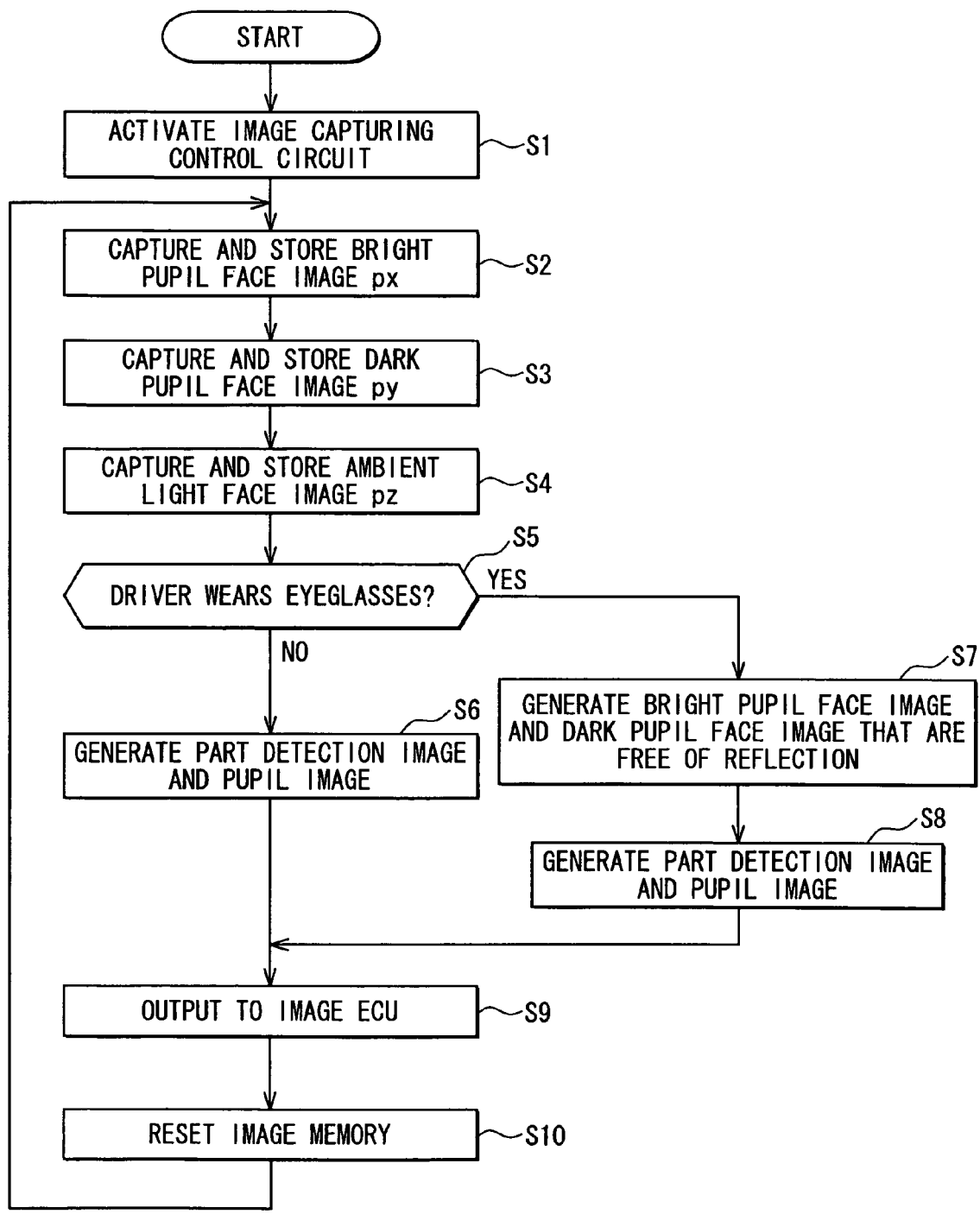
FIG. 11 is a flow chart for explaining an operation of the face image capturing apparatus.

Next, the operation of the face image capturing apparatus including the luminance calculation process is described with reference to a flow chart shown in FIG. 11. Firstly, at step S1, the image capturing control circuit 32 is activated. At step S2, the bright pupil face image px is captured and the image information of the captured face image px is stored in the image memory 21. At step S3, the dark pupil face image py is captured, and the image information of the captured face image py is stored in the image memory 21. At step S4, the ambient light face image pz is captured, and the image information of the captured face image pz is stored in the image memory 21.

At step S5, it is determined whether the driver wears a reflective object having the glossy reflective surface, such as the eyeglasses, the sunglasses. For example, by using operation inputting means (not shown), the driver is in advance caused to input a signal indicating whether the driver wears the eyeglasses, and the inputted signal is referred at step S5 for making the determination. When the affirmative determination is made at step S5 or when the driver wears the eyeglasses, control proceeds to step S7. In contrast, when the negative determination is made or when the driver does not wear the eyeglasses, control proceeds to step S6. Step S6 to step S8 correspond to the luminance calculation process.

At step S6, the part detection image and the pupil image shown in FIGS. 6A, 6B are generated. At step S7, the bright pupil face image pxpy and the dark pupil face image pypx shown in FIGS. 10A, 10B are generated. At step S8, the bright pupil face image pxpy, the dark pupil face image pypx, and the ambient light face image pz are used for generating the part detection image and the pupil image, which are free of the eyeglasses reflection and of the ambient light.

At step S9, a single composite image is synthesized or generated by combining the part detection image and the pupil image generated at step S6 or step S8 and the composite image is outputted to the image ECU 30. At step S10, the image information, which has been temporarily stored in the image memory 21, is reset or deleted, and control proceed to step S1 to repeat the above processes.

As above, the face image capturing apparatus described in the present embodiment executes calculation process for calculating the luminance of each of the three face images. As above, the three face images are the bright pupil face image px, the dark pupil face image py, and the ambient light face image pz, which have parts having different luminance from each other. Thus, by using the luminance of each of the three face images, the part detection image and the pupil image, which are free of the eyeglasses reflection and the ambient light (e.g., the sunlight), are enabled to be obtained.

One embodiment of the present invention has been described as above. However, the present invention is not limited to the above embodiment. The present invention may be modified in various manners without departing from the principle of the present invention.

For example, the wavelength of the light applied from the light sources of the on-axis illuminator 50 and the off-axis illuminator 70 may be made changeable such that the light is applied to the face of the driver while the wavelength is being changed. In the above configuration, because the different luminance is detected for the different color of the skin of the driver, human race may be specified to some extent. If the human race is specified, the part that corresponds to the face is more easily extracted. In the above case, a wavelength suitable for reliably detecting the part corresponding to the face may be found based on the face images of the different wavelengths. Further, in order to find the suitable wavelength, the edge intensity of the luminance may be referred to.

Also, in the present embodiment, the exposure time is set as about 300 μsec, and the image capturing time interval is set as about 30 μsec. However, the above exposure time and the above image capturing time interval are not limited to the above values and are changeable as required.

Also, in a case, where one application program mounted on the vehicle does not require the pupil position of the driver, the bright pupil face image px, the dark pupil face image py, and the ambient light face image pz are not necessarily captured every time. In other alternative case, in response to a command signal from the other application program, the imaging may be omitted or stopped.

In the above embodiment, each of the illuminator 50, 70 is controlled by the corresponding control device 40, 60, respectively. However, alternatively, both the illuminator 50, 70 may be controlled by a single common control device.

Additional advantages and modifications will readily occur to those skilled in the art. The invention in its broader terms is therefore not limited to the specific details, representative apparatus, and illustrative examples shown and described.

What is claimed is:

1. A face image capturing apparatus comprising:
a camera that repeatedly captures an image of a face of an occupant of a vehicle;
an on-axis illuminator that is arranged generally coaxially relative to an optical axis of the camera;
an off-axis illuminator that is arranged non-coaxially relative to the optical axis of the camera;
an illumination control device that is configured to adjust an illumination condition of light applied to the face of the occupant by controlling a light quantity of light emitted by the on-axis illuminator and a light quantity of light emitted by the off-axis illuminator;
an image capturing control device that is configured to control the camera to capture the image of the face at an image capturing timing that is synchronized with a timing for adjusting the illumination condition by the illumination control device; and
a luminance calculation process device that is configured to perform a luminance calculation process by using following face images:
a bright pupil face image captured by the camera under a first illumination condition, in which light is applied to the face mainly by the on-axis illuminator;
a dark pupil face image captured by the camera under a second illumination condition, in which light is applied to the face mainly by the off-axis illuminator; and
an ambient light face image captured by the camera under a third illumination condition, in which ambient light around the occupant is mainly applied to the face.

2. The face image capturing apparatus according to claim 1, further comprising:
reflective object determining means for determining whether a reflective object exists in an imaging field of the camera, the reflective object having a glossy reflective surface, wherein:
the luminance calculation process device performs a luminance subtraction process for subtracting luminance of one of the bright pupil face image and the dark pupil face image from luminance of the other one of the bright pupil face image and the dark pupil face image when the reflective object determining means determines that the reflective object exists;
the luminance calculation process device includes reflective range specifying means for specifying a first reflective range of the reflective object in the bright pupil face image and for specifying a second reflective range of the reflective object in the dark pupil face image based on a result of the luminance subtraction process; and
the luminance calculation process device executes the luminance calculation process, in which:
luminance of the first reflective range in the bright pupil face image is replaced with luminance of a part in the dark pupil face image, which part corresponds to the first reflective range; and
luminance of the second reflective range in the dark pupil face image is replaced with luminance of a part in the bright pupil face image, which part corresponds to the second reflective range.

3. The face image capturing apparatus according to claim 1, wherein:
each of the on-axis illuminator and the off-axis illuminator includes a plurality of light sources; and
each of the plurality of light sources is arranged generally in a vertical direction.

4. The face image capturing apparatus according to claim 3, wherein:
the plurality of light sources of the on-axis illuminator is arranged in the vertical direction to form only a first linear shape; and
the plurality of light sources of the off-axis illuminator is arranged in the vertical direction to form only a second linear shape.

5. The face image capturing apparatus according to claim 1, wherein:
the luminance calculation process device executes an image generation process, in which:
a part detection image and a pupil image are generated based on the face images, to which the luminance calculation process is performed, the part detection image being used for detecting a part that corresponds to the face of the occupant, the pupil image being used for detecting a position of a pupil the occupant; and
the part detection image and the pupil image are combined to generate a composite image; and
the luminance calculation process device outputs image information of the composite image generated in the image generation process.

6. The face image capturing apparatus according to claim 5, wherein the luminance calculation process device colors a part in the pupil image, which part corresponds to the pupil, when the luminance calculation process device generates the composite image.

7. The face image capturing apparatus according to claim 1, wherein:
each of the on-axis illuminator and the off-axis illuminator includes a plurality of light sources;
the on-axis illuminator and the off-axis illuminator are spaced away from each other generally in a horizontal direction; and
the plurality of light sources of the on-axis illuminator and the plurality of light sources of the off-axis illuminator are arranged generally in a direction that is orthogonal to the horizontal direction.

8. The face image capturing apparatus according to claim 1, wherein:
the luminance calculation process device performs the luminance calculation process to generate an extracted face image by extracting only a luminance-different part of each of the bright pupil face image, the dark pupil face image, and the ambient light face image; and
the luminance-different part of one of the bright pupil face image, the dark pupil face image, and the ambient light face image has luminance that is different from luminance of a corresponding part in the other one of the bright pupil face image, the dark pupil face image, and the ambient light face image.

9. The face image capturing apparatus according to claim 1, wherein:
in the ambient light face image, the light applied to the face is mainly ambient light.

10. A face image capturing apparatus for a vehicle comprising:
a camera that repeatedly captures an image of a face of an occupant of the vehicle;
an on-axis illuminator that is arranged generally on an optical axis of the camera;

an off-axis illuminator that is arranged generally off the optical axis of the camera;

an illumination control device that is configured to control the on-axis illuminator and the off-axis illuminator for adjustment of an illumination condition of light that is applied to the face of the occupant;

an image capturing control device that is configured to control the camera to capture the image of the face at an image capturing timing that is synchronized with a timing of the illumination control device for adjusting the illumination condition; and a luminance calculation process device that is configured to generate at least one difference image of the face of the occupant using a bright pupil face image, a dark pupil face image, and an ambient light face image, the bright pupil face image being captured by the camera under a first illumination condition, in which the face receives light emitted mainly by the on-axis illuminator, the dark pupil face image being captured by the camera under a second illumination condition, in which the face receives light emitted mainly by the off-axis illuminator, the ambient light face image being captured by the camera under a third illumination condition, in which the face receives mainly ambient light around the occupant.

11. The face image capturing apparatus according to claim 10, wherein:

each of the on-axis illuminator and the off-axis illuminator includes a plurality of light sources;

the on-axis illuminator and the off-axis illuminator are spaced away from each other in a horizontal direction; and the plurality of light sources of the on-axis illuminator and the plurality of light sources of the off-axis illuminator are arranged in a direction that is orthogonal to the horizontal direction.

12. The face image capturing apparatus according to claim 11, wherein:

the plurality of light sources of the on-axis illuminator is arranged in the orthogonal direction to form only a first linear shape; and the plurality of light sources of the off-axis illuminator is arranged in the orthogonal direction to form only a second linear shape.

13. The face image capturing apparatus according to claim 10, wherein:

the at least one difference image includes a part detection image and a pupil image, the part detection image being used for detecting a part that corresponds to the face of the occupant, the pupil image being used for detecting a position of a pupil the occupant; and the part detection image and the pupil image are combined to generate a composite image.

14. The face image capturing apparatus according to claim 10, wherein:

the luminance calculation process device generates an extracted face image by extracting only a luminance-different part of each of the bright pupil face image, the dark pupil face image, and the ambient light face image; and the luminance-different part of one of the bright pupil face image, the dark pupil face image, and the ambient light face image has luminance that is different from luminance of a corresponding part in the other one of the bright pupil face image, the dark pupil face image, and the ambient light face image.

15. The face image capturing apparatus according to claim 10, wherein:

in the ambient light face image, the light applied to the face is mainly ambient light.

* * * * *